June 19, 1951 R. G. COWLES 2,557,534
WINDSHIELD WIPER
Filed Jan. 28, 1948

Inventor
Relvia G. Cowles

By Clarence A. O'Brien
and Harvey B. Jacobson
Attorneys

Patented June 19, 1951

2,557,534

UNITED STATES PATENT OFFICE 2,557,534

WINDSHIELD WIPER

Relvia G. Cowles, Jackson Heights, N. Y.

Application January 28, 1948, Serial No. 4,867

1 Claim. (Cl. 318—358)

This invention relates to new and useful improvements and structural refinements in windshield wipers for automobiles, trucks, and similar vehicles, and the principal object of the invention is to provide a device of the character herein described, wherein the operating speed of the windshield wiping blade is automatically increased as the engine of the vehicle is abruptly accelerated, so that retarded operation of the wiper, or in some instances, a temporary inoperation of the wiper is eliminated, such as is commonly experienced when a vehicle equipped with wipers of conventional type encounters steep hills, or attempts to pass other vehicles on the highway.

This object is achieved by providing the vehicle with an electrically actuated wiper, together with means for automatically increasing the supply of current to such wiper when the engine is abruptly accelerated.

Another feature of the invention resides in the provision of a windshield wiping system which, notwithstanding its increased wiping action under abrupt engine acceleration, may be readily adjusted so as to operate at a predetermined, desired speed under normal driving conditions.

A further important feature of the invention is to provide a windshield wiping system which is simple in construction, which may be easily and conveniently manipulated, and which may be effectively employed with vehicles of various types, either new or those which are already in existence.

Figure 1:
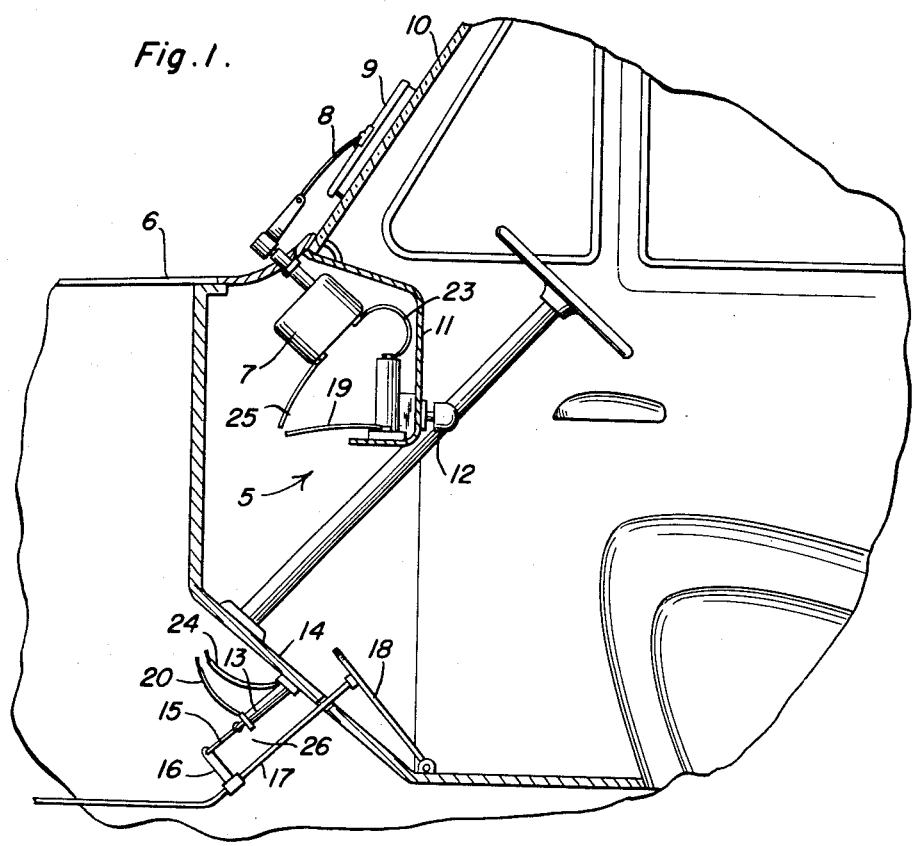
Figure 2:
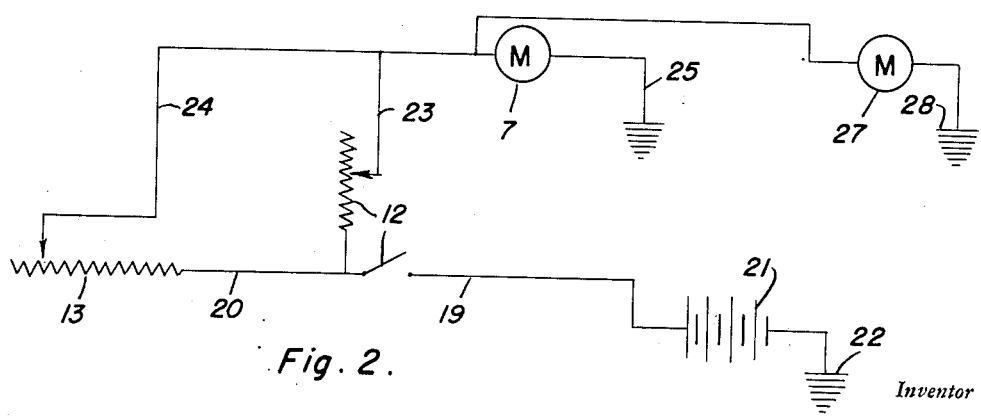

With the above more important objects in view, and such other objects as may become apparent as this specification proceeds, the invention consists essentially of the arrangement and construction of parts as illustrated in the accompanying drawings, in which:

Figure 1 is a fragmentary cross-sectional view of a vehicle showing the invention in situ thereon; and Figure 2 is a wiring diagram, showing the electrical connection of the various components of the invention.

Like characters of reference are employed to designate like parts in the specification and throughout the several views.

Referring now to the accompanying drawings in detail, the invention consists of a windshield wiping system that is designated generally by the reference character 5, the same being adapted for use in association with any vehicle of a conventional type, such as for example, that which is fragmentarily illustrated and designated by the reference character 6.

The wiping system 5 embodies in its construction an electric motor 7 of any suitable type which is operatively connected to a conventional wiper arm and blade 8 and 9 respectively, adapted for oscillatory movement on the windshield 10 of the vehicle.

The motor 7 is suitably mounted behind the instrument panel 11 of the vehicle, and a combined on-and-off switch and rheostat 12 is provided on the instrument panel, as will be clearly apparent.

This switch and rheostat is of well-known conventional nature, performing a two-fold function, namely, that of closing and opening the circuit as well as controlling the strength of current in the circuit so that the appliance (motor 7) may not only be started or stopped, but so that the speed of operation thereof may be regulated, as desired.

A further rheostat 13 is mounted under the floorboard 14 of the vehicle, the rheostat 13 being controlled by a slidable rod 15 which, in turn, is connected by means of a rigid bracket 16 to the conventional, longitudinally shiftable link 17 operated by a depressible accelerator pedal 18.

The switch and rheostat 12 as well as the rheostat 13 are connected by means of conductors 19, 20, respectively, to one pole of a storage battery 21 with which the vehicle 6 is usually provided, the remaining pole of this battery being grounded as at 22. Moreover, the switch and rheostat as well as the rheostat 13 are connected by means of conductors 23, 24, respectively, to the motor 7, and the latter is, in turn, grounded as at 25.

It is to be noted that while the switch and rheostat 12 is connected in parallel to the rheostat 13, the switch and rheostat 12 as well as the rheostat 13 are connected in series with the battery 21 and the motor 7, as is clearly shown in the wiring diagram illustrated in Figure 2.

As a result, when the invention is placed in use, the motor 7 may be started or stopped and its speed effectively controlled as desired by simply manipulating the switch and rheostat 12, that is to say, when the vehicle is operating under normal driving conditions.

Under such conditions, the resistance offered by the rheostat 13 is at maximum, but when the vehicle ascends a steep grade or endeavors to pass another vehicle on the highway, the speed of the engine is, of course, accelerated by depressing the pedal 18, which action will slide the rod 15 in the direction of the arrow 26, thereby reducing the resistance of the rheostat 13.

As a result, under such conditions the speed of the motor 7 will be substantially increased, as will be clearly apparent.

If desired, an additional motor 27 may be connected in series to the motor 7 and grounded as at 28, where dual windshield wipers are provided on the vehicle.

It is believed that the advantages and use of the invention will be clearly understood from the foregoing description and accordingly, further explanation thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

In combination with a vehicle engine including a throttle valve, a depressible pedal and a longitudinally shiftable link operatively connecting said pedal to said valve, a windshield wiping system including an electric wiper actuating motor, a rheostat connected in series with said motor to a source of electric current, said rheostat including a longitudinally shiftable control rod, and a bracket rigidly secured to said link for movement therewith, said rod being connected to said bracket whereby said rheostat may be positively actuated to control the speed of said motor by the actuation of said pedal.

RELVIA G. COWLES.

REFERENCES CITED

The following references are of record in the file of this patent:

UNITED STATES PATENTS

| Number | Name | Date |
|---|---|---|
| 1,806,705 | Post | May 26, 1931 |
| 2,192,714 | Norman et al. | Mar. 5, 1940 |
| 2,359,553 | Fuller | Oct. 3, 1944 |
| 2,386,304 | Elberty | Oct. 9, 1945 |